United States Patent
Hashimoto et al.

(10) Patent No.: US 11,273,784 B2
(45) Date of Patent: Mar. 15, 2022

(54) SIDE SUPPORT BLOCK FOR VEHICLE SEAT

(71) Applicant: TACHI-S CO., LTD., Tokyo (JP)

(72) Inventors: Shuhei Hashimoto, Tokyo (JP); Kenji Sato, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/898,162

(22) Filed: Jun. 10, 2020

(65) Prior Publication Data
US 2020/0391692 A1 Dec. 17, 2020

(30) Foreign Application Priority Data
Jun. 12, 2019 (JP) .............................. JP2019-109789

(51) Int. Cl.
*B60R 21/231* (2011.01)
*B60R 21/207* (2006.01)

(52) U.S. Cl.
CPC ...... *B60R 21/23138* (2013.01); *B60R 21/207* (2013.01); *B60R 2021/23146* (2013.01)

(58) Field of Classification Search
None
See application file for complete search history.

(56) References Cited

U.S. PATENT DOCUMENTS

| | | | |
|---|---|---|---|
| 8,752,861 B2 * | 6/2014 | Fukawatase | B60R 21/207 280/728.2 |
| 9,630,584 B2 * | 4/2017 | Fujiwara | B60R 21/2171 |
| 9,896,053 B2 * | 2/2018 | Tanabe | B60N 2/986 |
| 10,005,418 B2 * | 6/2018 | Ito | B60N 2/986 |
| 2017/0021793 A1 | 1/2017 | Ito et al. | |
| 2018/0001861 A1 * | 1/2018 | Tanabe | B60R 21/017 |
| 2021/0031717 A1 * | 2/2021 | Fuma | B60R 21/207 |

FOREIGN PATENT DOCUMENTS

JP 2017-024504 A 2/2017

\* cited by examiner

*Primary Examiner* — Faye M Fleming
(74) *Attorney, Agent, or Firm* — Paratus Law Group, PLLC

(57) ABSTRACT

A side support block for a vehicle seat configured to be disposed adjacent to a lateral side of a seat back of the vehicle seat includes an airbag module, a cushion pad having a recessed portion accommodating the airbag module on a rear surface of the seat back, a frame embedded in the cushion pad, and a bracket with which the airbag module is fixed to the frame. The bracket includes a fixing portion to be fixed to a vehicle body, and the fixing portion is disposed behind the airbag module.

2 Claims, 7 Drawing Sheets

SIDE SUPPORT BLOCK FOR VEHICLE SEAT

CROSS REFERENCE TO RELATED APPLICATIONS

This application claims priority to Japanese Patent Application No. 2019-109789 filed on Jun. 12, 2019, the content of which is incorporated herein by reference.

BACKGROUND

Field of the Invention

The present invention relates to side support blocks for vehicle seats, and more particularly, relates to a side support block configured to be disposed adjacent to a lateral side of a seat back of a vehicle seat.

Related Art

For a vehicle such as an automobile, one design includes a side support block disposed adjacent to, for example, a lateral side of a seat back of a rear seat, and the side support block is fixed to a vehicle body. Further, a side support block incorporating an airbag module is also known (see, for example, JP-2017-24504-A).

A side support block disclosed in JP-2017-24504-A includes a base member made of resin and a cushion pad covering the base member. A bracket with which the base member is fixed to a vehicle body is attached to an upper end portion and a lower end portion of the base member. An airbag module is sandwiched between the base member and the cushion pad, and is fixed to a central portion of the base member.

The base member receives a recoil produced when the airbag inflates. Thus the base member necessitates strength enough to receive the recoil, but this may increase a cost. The base member made of resin can be reinforced by a rib or the like to meet strength requirement, but this may make a structure thereof complicated.

SUMMARY

Illustrative aspects of the present invention provide a side support block with a simple structure at low cost.

According to an illustrative aspect of the present invention, a side support block for a vehicle seat configured to be disposed adjacent to a lateral side of a seat back of the vehicle seat includes: an airbag module; a cushion pad having a recessed portion on a rear surface of the cushion pad, the recessed portion accommodating the airbag module; a frame embedded in the cushion pad; and a bracket with which the airbag module is fixed to the frame. The bracket includes a fixing portion to be fixed to a vehicle body, and the fixing portion is disposed behind the airbag module.

DETAILED DESCRIPTION OF THE EXEMPLARY EMBODIMENTS

Figure 1:
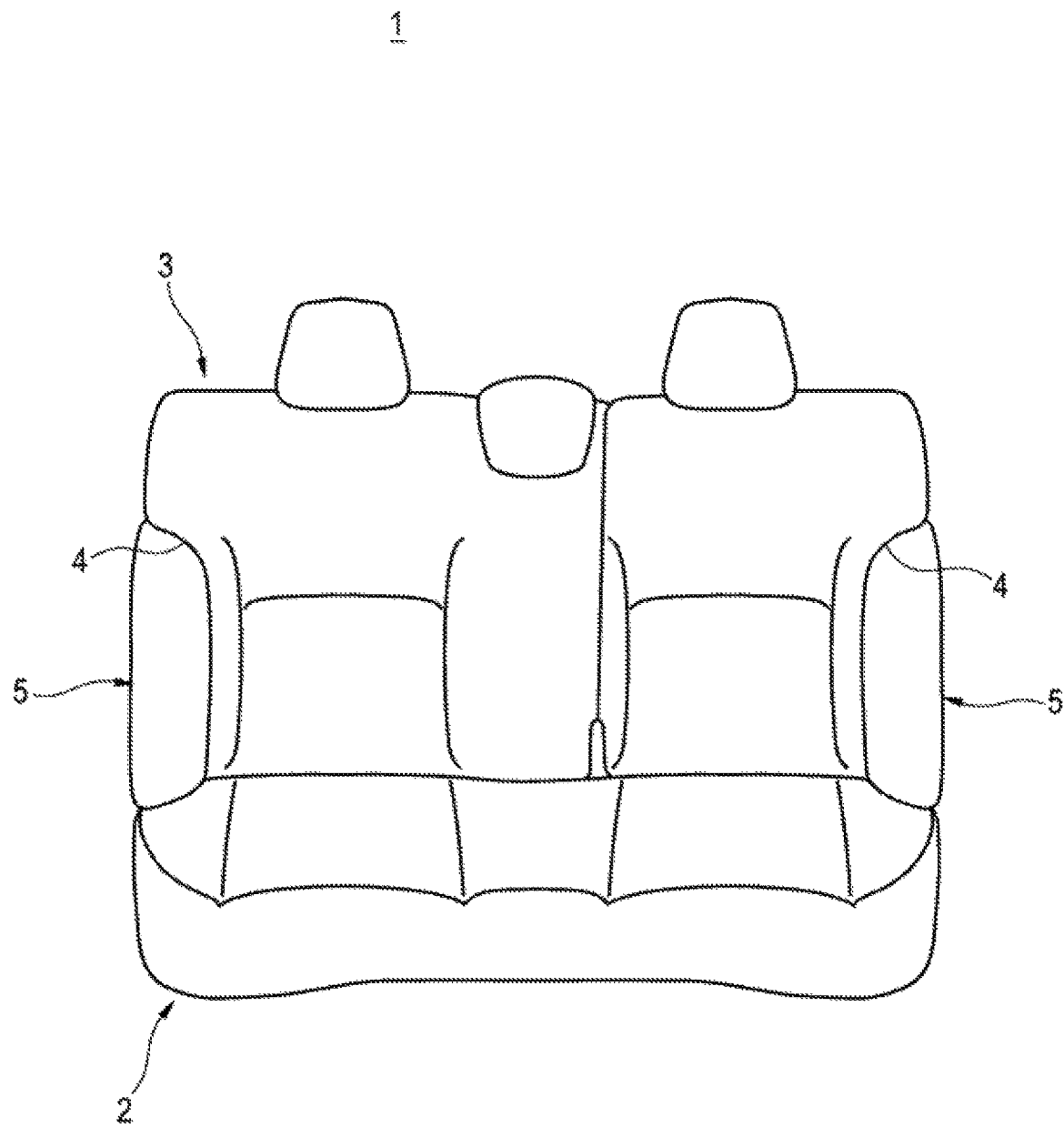
FIG. 1 is a front view of a vehicle seat including a side support block according to an embodiment of the present invention.

FIG. 1 illustrates a vehicle seat serving as an example for illustrating an embodiment of the invention.

The vehicle seat 1 is a seat mounted on a vehicle such as an automobile, and is a bench seat that can seat a plurality of occupants side by side. The seat 1 includes a seat cushion 2 that supports the buttocks and thighs of the occupant, and a seat back 3 that supports the waist and the back of the occupant. The seat back 3 includes recessed portions 4 on both sides of the seat back 3, and the recessed portions 4 extend from a lower end of the seat back 3 to the middle of an entire height of the seat back 3, respectively. A side support block 5 fixed to a vehicle body is fitted into each recessed portion 4. The recessed portion 4 and the side support block 5 may extend from the lower end to an upper end of the seat back 3.

Figure 2:
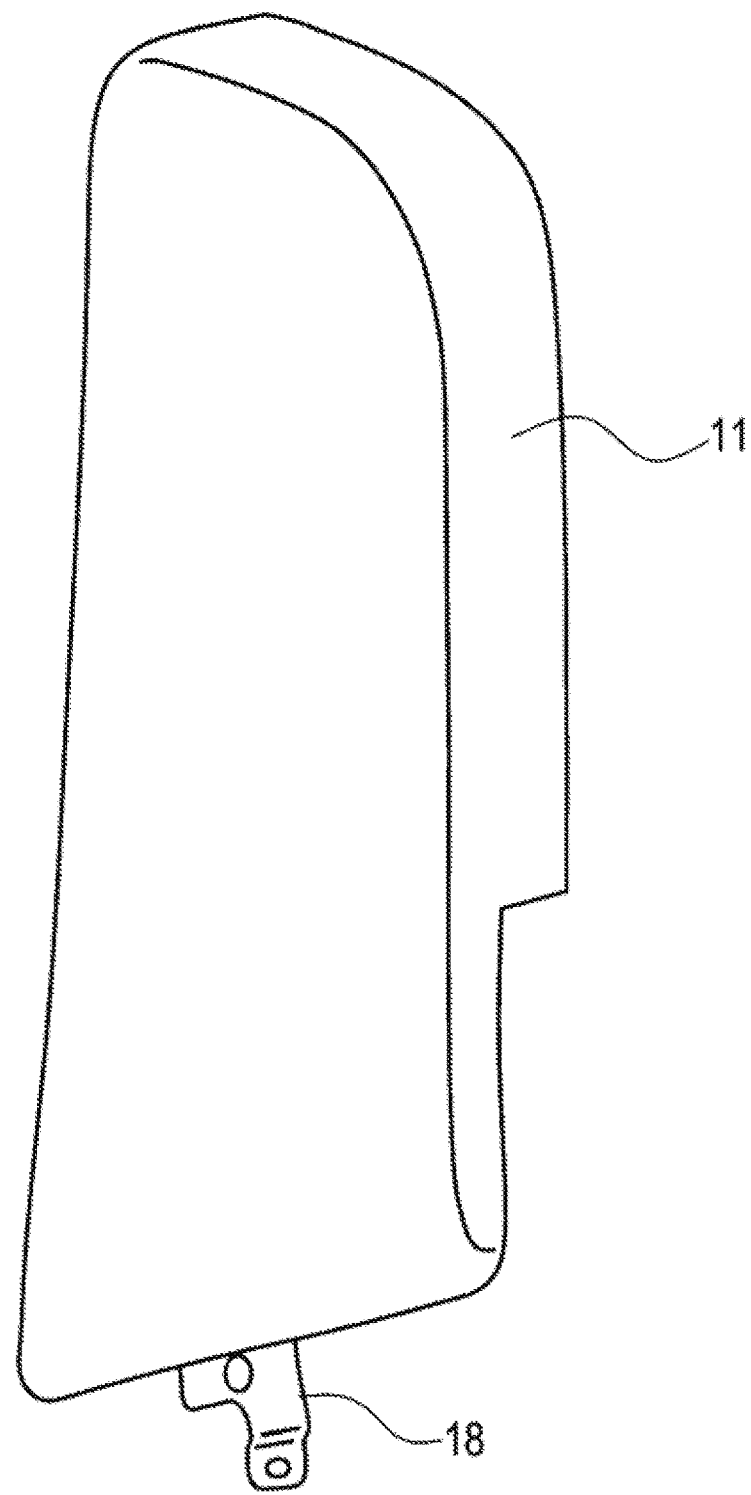
FIG. 2 is a front view of a side support block shown in FIG. 1.
Figure 3:
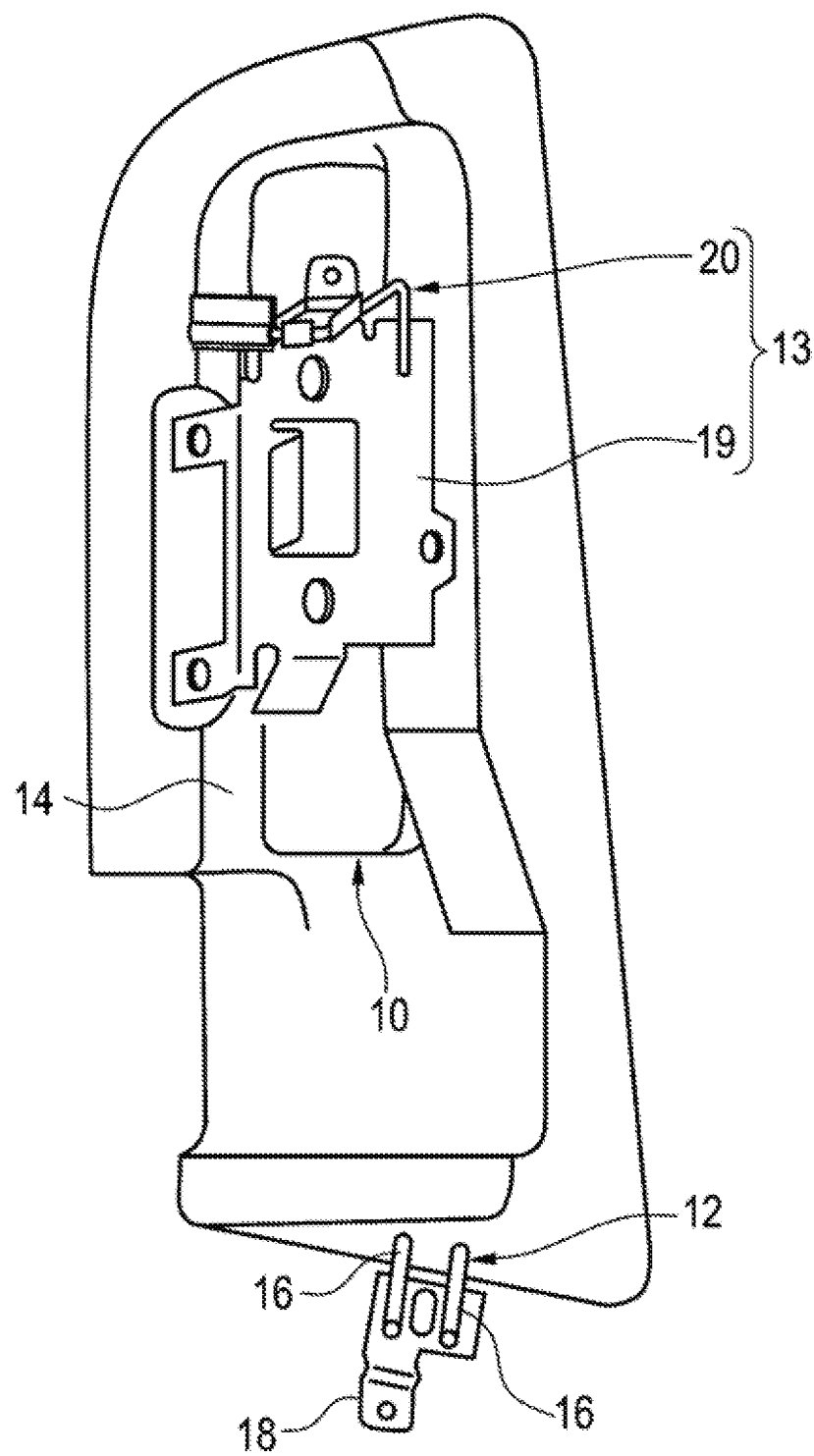
FIG. 3 is a rear view of the side support block shown in FIG. 1.
Figure 4:
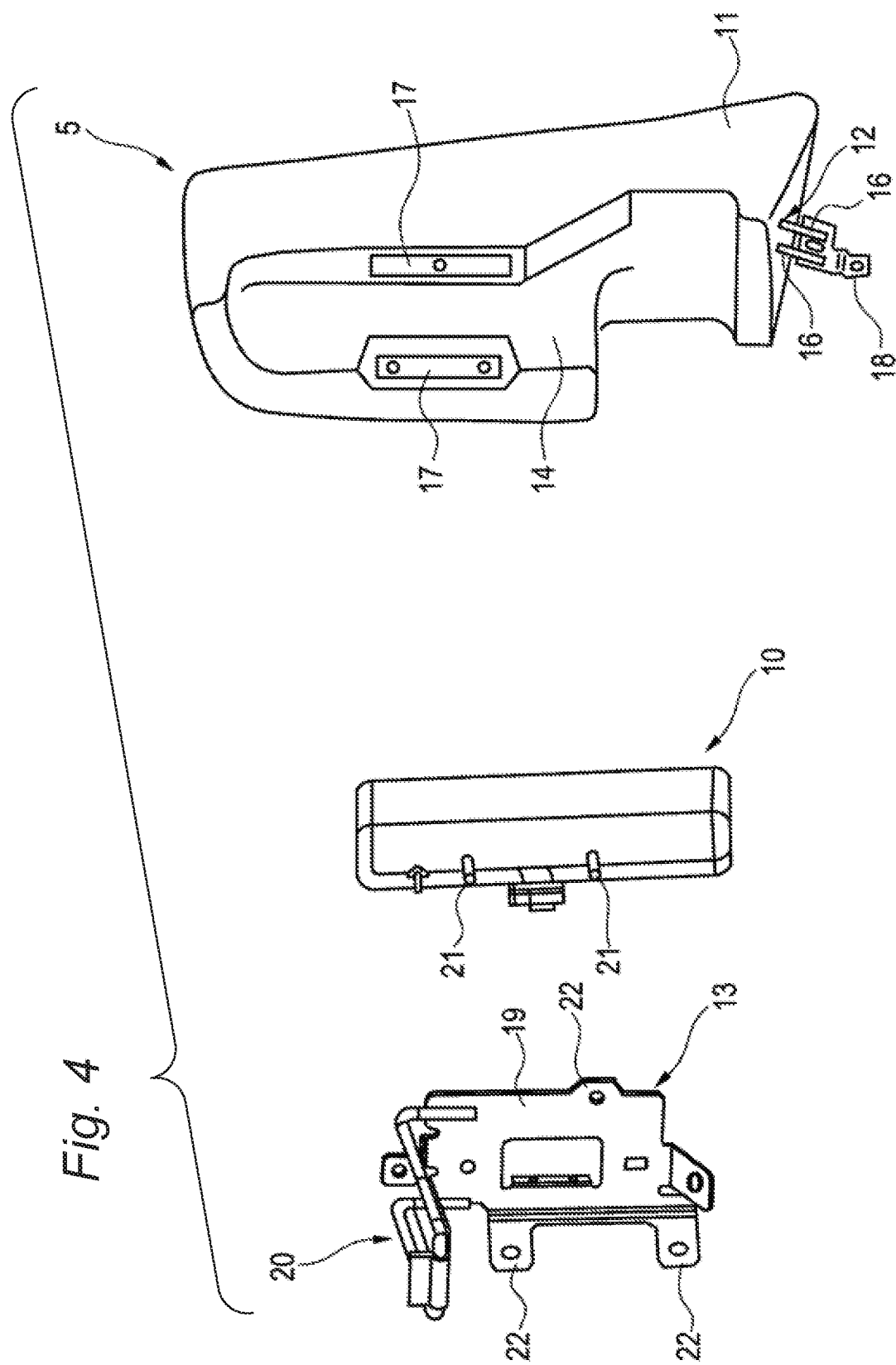
FIG. 4 is an exploded view of the side support block shown in FIG. 1.

FIGS. 2 to 4 illustrate the side support block 5.

The side support block 5 includes an airbag module 10, a cushion pad 11, a frame 12, and a bracket 13.

The airbag module 10 includes an airbag and an inflator that inflates the airbag. The inflator operates based on a signal output from a sensor that detects a collision of the vehicle, and generates a gas for inflating the airbag. The sensor may be incorporated in the airbag module 10, or may be provided separately from the airbag module 10, at an appropriate location of the vehicle.

The cushion pad 11 is a relatively soft resin foam such as urethane foam. The cushion pad 11 has a recessed portion 14, which accommodates the airbag module 10 therein, on a rear surface of the cushion pad 11. Outer surfaces of the cushion pad 11 excluding the rear surface is covered with a trim cover (not illustrated) made of skin material such as leather (natural leather, synthetic leather), woven fabric, non-woven fabric, or knitted fabric.

The frame 12 includes a plurality of wires 16 made of metal such as steel, and fixing plates 17 and 18 joined to the wires 16. The plurality of wires 16 are appropriately bent and joined to form a skeleton of the side support block 5. The wires 16 are embedded inside the cushion pad 11. The cushion pad 11 containing the wire 16 is manufactured, for example, by integral foam molding.

The wire 16 includes a portion that is disposed around the recessed portion 14 of the cushion pad 11. The fixing plate 17 is joined to the part of the wire 16, which is disposed around the recessed portion 14, and is partially exposed on a surface of the recessed portion 14. The airbag module 10 accommodated in the recessed portion 14 is fixed to the fixing plate 17 via the bracket 13.

In this example, the wire 16 includes another portion that protrudes from a lower end portion of the cushion pad 11, and the fixing plate 18 is joined to a protruding distal end portion of the wire 16. The fixing plate 18 is fixed to the vehicle body.

Figure 5:
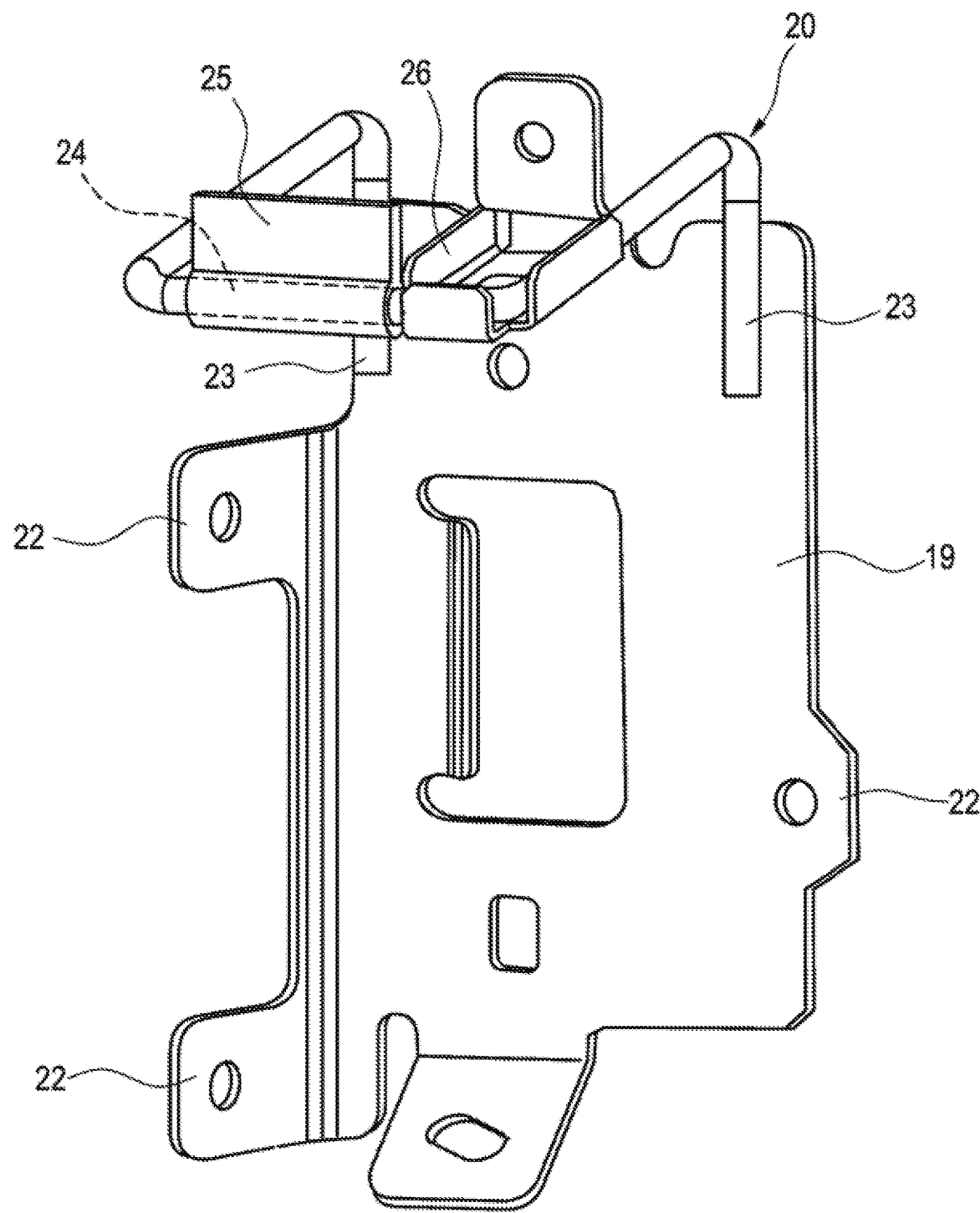
FIG. 5 is an enlarged view of a bracket shown in FIG. 4.

FIG. 5 is an enlarged view of the bracket 13.

The bracket 13 with which the airbag module 10 is fixed to the frame 12 includes a base plate 19 and a fixing portion 20.

The base plate 19 is made of metal such as steel. The base plate 19 is disposed behind the airbag module 10. The airbag module 10 includes a stud bolt 21 provided on a rear surface of the airbag module 10, and the airbag module 10 is joined to the base plate 19 by the stud bolt 21. The base plate 19 includes a joining portion 22 that is to be joined to the fixing plate 17 of the frame 12, and the base plate 19, including the joining portion 22, has a one piece structure. The joining portion 22 is joined to the fixing plate 17 by, for example, a bolt.

The fixing portion 20 includes a wire made of metal such as steel, and the fixing portion 20, including the wire, has a separate structure from the base plate 19. The wire of the fixing portion 20 is bent into a U-shape, both end portions 23 of the wire of the fixing portion 20 are joined to a rear surface of the base plate 19, and an intermediate portion of the wire of the fixing portion 20 extends rearward of the base plate 19. Accordingly, the fixing portion 20 is disposed behind the airbag module 10 joined to the base plate 19. The fixing portion 20 is to be fixed to the vehicle body.

Figure 6:
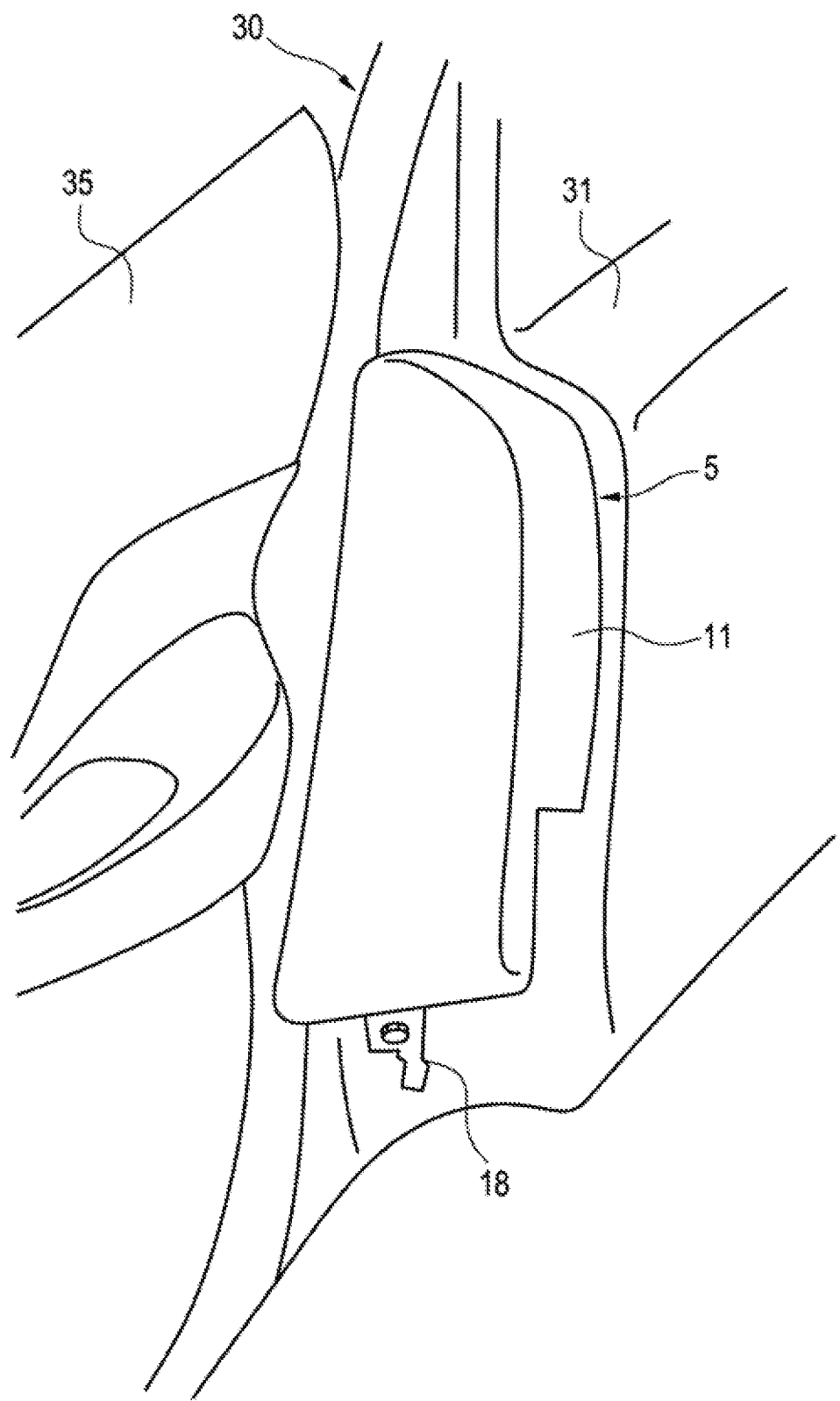
FIG. 6 is a perspective view of a vehicle body to which the side support block shown in FIG. 1 is fixed.
Figure 7:
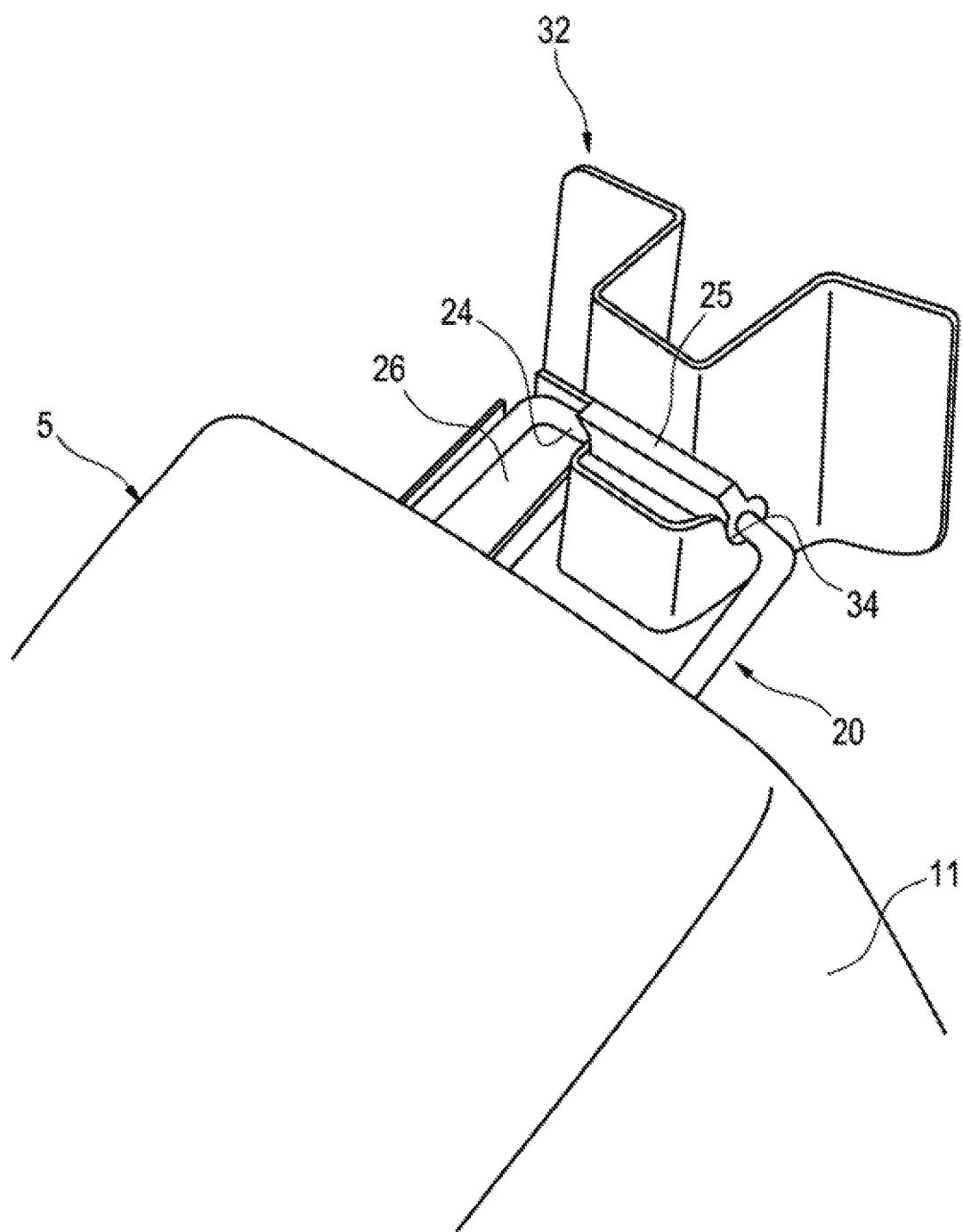
FIG. 7 is a perspective view of a fixing structure in which a fixing portion of the bracket shown in FIG. 4 is fixed to a vehicle body.

FIGS. 6 and 7 illustrate a state where the side support block 5 is fixed to the vehicle body.

The side support block 5 is fixed to a front wall of a rear wheel house 31 of a vehicle body 30. The rear wheel house 31 is provided with a hook 32, and the wire of the fixing portion 20 is hooked to the hook 32. The fixing plate 18 is joined to the front wall of the rear wheel house 31 by a bolt or the like.

The hook 32 includes a slit 34 into which the wire of the fixing portion 20 is inserted. An engaging portion 24, which is a folded portion of the U-shaped wire of the fixing portion 20, is inserted into the slit 34. By inserting the engaging portion 24 into the slit 34, the fixing portion 20 is hooked to the hook 32. Although the fixing portion 20 is disposed behind the airbag module 10 and the fixing portion 20 is hidden behind the cushion pad 11, when the side support block 5 is to be fixed to the vehicle body 30, the fixing work is easy since the fixing of the fixing portion 20 to the hook 32 is performed by hooking.

The fixing portion 20 includes a buffer member 25 such as felt wound around the engaging portion 24. The buffer member 25 prevents repeated contact between the engaging portion 24 and the hook 32 caused by vibration or the like of the vehicle, and further a hitting noise caused by the contact therebetween. The fixing portion 20 further includes a spacer 26 attached to an end portion of the engaging portion 24 protruding from the slit 34. The spacer 26 is in contact with a side surface of the hook 32, and positions the engaging portion 24 with respect to the hook 32. The spacer 26 prevents rattling of the engaging portion 24 and the hitting noise caused by the contact between the engaging portion 24 and the hook 32.

The airbag of the airbag module 10 inflates forward along a rear door 35. The base plate 19 that supports the airbag module 10 from behind is connected to the vehicle body 30 via the fixing portion 20, and the fixing portion 20 is disposed behind the airbag module 10. Thus the vehicle body 30 receives the recoil produced when the airbag is inflated via the fixing portion 20. This relaxes a strength requirement for the base plate 19, provides the base plate 19 with a relatively simple structure such as one obtained by press molding, in which reinforcement by a rib is omitted, and reduces the cost thereof.

Hereinbefore, the invention has been described by taking the vehicle seat 1 installed on a vehicle such as an automobile as an example, the invention can also be applied to a vehicle seat installed on other vehicles such as a ship or an aircraft.

According to the embodiments of the invention described above, a side support block for a vehicle seat configured to be disposed adjacent to a lateral side of a seat back of the vehicle seat includes: an airbag module; a cushion pad having a recessed portion on a rear surface of the cushion pad, the recessed portion accommodating the airbag module; a frame embedded in the cushion pad; and a bracket with which the airbag module is fixed to the frame. The bracket includes a fixing portion to be fixed to a vehicle body, and the fixing portion is disposed behind the airbag module.

The fixing portion may include a wire configured to being hooked to a hook provided on the vehicle body.

An engaging portion of the wire configured to engage with the hook may be covered with a buffer member.

What is claimed is:

1. A side support block for a vehicle seat configured to be disposed adjacent to a lateral side of a seat back of the vehicle seat, the side support block comprising:
   an airbag module;
   a cushion pad having a recessed portion on a rear surface of the cushion pad, the recessed portion accommodating the airbag module;
   a frame embedded in the cushion pad; and
   a bracket with which the airbag module is fixed to the frame,
   wherein the bracket includes a fixing portion to be fixed to a vehicle body,
   wherein the fixing portion is disposed behind the airbag module, and
   wherein the fixing portion includes a wire configured to being hooked to a hook provided on the vehicle body.

2. The side support block according to claim 1,
   wherein an engaging portion of the wire configured to engage with the hook is covered with a buffer member.

* * * * *